US012009582B2

(12) United States Patent
Takenaka et al.

(10) Patent No.: US 12,009,582 B2
(45) Date of Patent: Jun. 11, 2024

(54) ANTENNA MODULE AND VEHICLE ROOF WITH ANTENNA MODULE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Yuji Takenaka, Mie (JP); Norichika Oomi, Mie (JP); Kosuke Sone, Mie (JP); Suguru Yamagishi, Osaka (JP); Takanori Fukunaga, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 249 days.

(21) Appl. No.: 17/625,373

(22) PCT Filed: Jul. 9, 2020

(86) PCT No.: PCT/JP2020/026832
§ 371 (c)(1),
(2) Date: Jan. 7, 2022

(87) PCT Pub. No.: WO2021/010274
PCT Pub. Date: Jan. 21, 2021

(65) Prior Publication Data

US 2022/0271421 A1 Aug. 25, 2022

(30) Foreign Application Priority Data

Jul. 12, 2019 (JP) ................................ 2019-129835

(51) Int. Cl.
*H01Q 1/32* (2006.01)
*H01Q 1/52* (2006.01)
(Continued)

(52) U.S. Cl.
CPC .......... *H01Q 1/3275* (2013.01); *H01Q 1/523* (2013.01); *H01Q 21/245* (2013.01); *H01Q 21/30* (2013.01)

(58) Field of Classification Search
CPC .... H01Q 1/3275; H01Q 1/523; H01Q 21/245; H01Q 21/30
(Continued)

(56) References Cited

U.S. PATENT DOCUMENTS

2003/0214447 A1 11/2003 Sasagawa et al.
2004/0217907 A1 11/2004 Inoue
(Continued)

FOREIGN PATENT DOCUMENTS

JP 2003-017916 1/2003
JP 2003-163531 6/2003
(Continued)

OTHER PUBLICATIONS

Office Action issued in Corresponding JP Patent Application No. 2021-533013, dated Aug. 2, 2022, along with an English translation thereof.
(Continued)

*Primary Examiner* — Peguy Jean Pierre
(74) *Attorney, Agent, or Firm* — Greenblum & Bernstein, P.L.C.

(57) ABSTRACT

An antenna module includes: a substrate; at least one first communication antenna by a frequency band belonging to a first frequency range; and at least one second communication antenna by a frequency band belonging to a second frequency range higher than the first frequency range,
(Continued)

wherein the at least one first communication antenna and the at least one second communication antenna are provided on the substrate, and the at least one first communication antenna is provided in a position closer to an edge of the substrate than the at least one second communication antenna.

6 Claims, 7 Drawing Sheets

(51) Int. Cl.
*H01Q 21/24* (2006.01)
*H01Q 21/30* (2006.01)
(58) Field of Classification Search
USPC .......................................................... 343/702
See application file for complete search history.

(56) References Cited

U.S. PATENT DOCUMENTS

2005/0073456 A1 4/2005 Sievenpiper et al.
2008/0246673 A1 10/2008 Kagaya et al.
2008/0291094 A1* 11/2008 Li ........................ H01Q 9/0464 343/700 MS
2017/0117617 A1* 4/2017 Huang ................. H01Q 9/0407
2017/0317408 A1 11/2017 Hamada et al.
2019/0118771 A1 4/2019 Tamane et al.
2022/0037776 A1* 2/2022 Sung .................... H01Q 1/3275

FOREIGN PATENT DOCUMENTS

JP 2003-332817 11/2003
JP 2008-278447 11/2008
JP 2011-91557 5/2011
JP 2016-197061 11/2016
JP 2017-060038 3/2017
JP 2017-200086 11/2017
JP 2019-078041 5/2019

OTHER PUBLICATIONS

International Search Report issued in International Pat. Appl. No. PCT/JP2020/026832, dated Sep. 29, 2020, along with an English translation thereof.

* cited by examiner

FIG. 6

| ARRANGEMENT No. | ITS (JP) | ITS (US) | sub6 | TEL |
|---|---|---|---|---|
| ARRANGEMENT 1 | (−110, 50) | (60, −60) | (60, 60), (−60, −60) | (110, 60), (−110, −60) |
| ARRANGEMENT 2 | (−100, 40) | (50, −50) | (50, 50), (−50, −50) | (100, 50), (−100, −50) |
| ARRANGEMENT 3 | (−90, 30) | (40, −40) | (40, 40), (−40, −40) | (90, 40), (−90, −40) |
| ARRANGEMENT 4 | (−70, 50) | (20, −20) | (20, 20), (−20, −20) | (70, 40), (−70, −40) |
| ARRANGEMENT 5 | (−70, 10) | (20, −20) | (20, 20), (−20, −20) | (70, 20), (−70, −40) |

FIG. 7

| ARRANGEMENT No. | ITS (JP) | | ITS (US) | |
|---|---|---|---|---|
| | Return LOSS [dB] | GAIN Ave [dBi] | Return LOSS [dB] | GAIN Ave [dBi] |
| ARRANGEMENT 1 | -1.6 | 3.1 | -15.5 | 2.0 |
| ARRANGEMENT 2 | -4.7 | 2.0 | -24.0 | 2.2 |
| ARRANGEMENT 3 | -1.7 | 3.9 | -12.8 | -74.8 |
| ARRANGEMENT 4 | -5.0 | 2.9 | -18.2 | 1.8 |
| ARRANGEMENT 5 | -1.8 | 2.5 | -22.8 | 2.7 |

ANTENNA MODULE AND VEHICLE ROOF WITH ANTENNA MODULE

TECHNICAL FIELD

The present disclosure relates to an antenna module and a vehicle roof with an antenna module.

BACKGROUND ART

Patent Document 1 discloses a roof module including a chassis, an antenna, a metal panel, and a module substrate integrated with each other.

PRIOR ART DOCUMENTS

Patent Documents

Patent Document 1: Japanese Patent Application Laid-Open No. 2017-200086

SUMMARY

Problem to be Solved by the Invention

An obstacle to radio wave is provided around a roof module in some cases. Improvement of a propagation environment of the radio wave is desired.

Thus, an object of the present disclosure is to improve a communication environment by radio wave in an antenna module.

Means to Solve the Problem

An antenna module according to the present disclosure includes: a substrate; at least one first communication antenna by a frequency band belonging to a first frequency range; and at least one second communication antenna by a frequency band belonging to a second frequency range higher than the first frequency range, wherein the at least one first communication antenna and the at least one second communication antenna are provided on the substrate, and the at least one first communication antenna is provided in a position closer to an edge of the substrate than the at least one second communication antenna.

Effects of the Invention

According to the present disclosure, a communication environment by radio wave in an antenna module is improved.

BRIEF DESCRIPTION OF DRAWINGS

FIG. 6 is a drawing illustrating an example of an arrangement 1 to an arrangement 5 of an antenna on a substrate.

FIG. 7 is a drawing illustrating a simulation result of a Return loss [dB] and a gain Ave in the arrangement 1 to the arrangement 5.

DESCRIPTION OF EMBODIMENT(S)

Description of Embodiment of Present Disclosure

Figure 1:
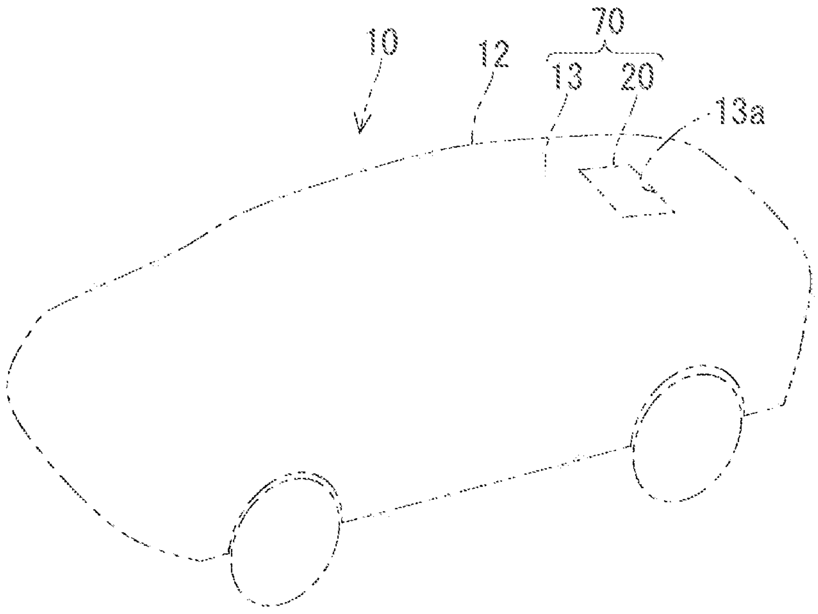
FIG. 1 is a schematic perspective view illustrating a vehicle into which an antenna module is incorporated.

Embodiments of the present disclosure are listed and described firstly.

An antenna module according to the present disclosure is as follows.

(1) An antenna module includes: a substrate; at least one first communication antenna by a frequency band belonging to a first frequency range; and at least one second communication antenna by a frequency band belonging to a second frequency range higher than the first frequency range, wherein the at least one first communication antenna and the at least one second communication antenna are provided on the substrate, and the at least one first communication antenna is provided in a position closer to an edge of the substrate than the at least one second communication antenna. The at least one second communication antenna by the frequency band belonging to the second frequency range higher than the first frequency range is provided in a position farther away from the edge of the substrate than the at least one first communication antenna. Thus, even if an obstacle to radio wave is located around the antenna module, radio wave from the at least one second communication antenna is hardly shielded by the obstacle. The at least one first communication antenna by the frequency band belonging to the first frequency range is provided in the position closer to the edge of the substrate than the at least one second communication antenna. Even if an obstacle to radio wave is located around the antenna module, radio wave of a relatively low frequency band is diffractively propagated easily. As a result, a communication environment by radio wave in an antenna module is improved.

(2) It is applicable that the first frequency range is a frequency band equal to or smaller than 2.1 GHz, and the second frequency range is a frequency band equal to or larger than 5.7 GHz. Accordingly, a communication environment by radio wave in an antenna module is improved.

(3) An enclosure which is an obstacle to radio wave may be disposed around the substrate. In a case where the enclosure which is the obstacle to the radio wave is disposed around the substrate, a communication environment by radio wave in an antenna module is effectively improved.

(4) A first communication antenna by a lowest frequency band in the at least one first communication antenna may be provided in a position with a smallest distance from the edge of the substrate in the at least one first communication antenna and the at least one second communication antenna. Even when, the first communication antenna by the lowest frequency band is provided in the position with the smallest distance from the edge of the substrate, radio wave from the first communication antenna by the lowest frequency band is diffractively propagated easily.

(5) A second communication antenna by a highest frequency band in the at least one second communication antenna may be provided in a position with a largest distance from the edge of the substrate in the at least one first communication antenna and the at least one second communication antenna. The second communication antenna by the highest frequency band is provided in the position with the largest distance from the edge of the substrate, thus radio wave from the second communication antenna by the highest frequency band is hardly shielded by an obstacle.

(6) It is also applicable that a vehicle roof with an antenna module includes: the antenna module according to any one of the (1) to (5); and a vehicle roof which is an obstacle to radio wave of at least a part of frequency band, wherein an opening is formed in the vehicle roof, and the antenna module is fitted into the opening. The vehicle roof shields the radio wave of at least a part of frequency band at an inner side and an outer side of the vehicle interior. The antenna module is fitted into the opening of the vehicle roof, thus the antenna can favorably perform communication with an external apparatus. At this time, the roof may be an obstacle to the communication. However, the at least one second communication antenna by the frequency band belonging to the second frequency range higher than the first frequency range is provided in the position farther away from the edge of the substrate than the at least one first communication antenna. Thus, even if the vehicle roof is located around the antenna module, radio wave from the at least one second communication antenna is hardly shielded by the vehicle roof. The at least one first communication antenna by the frequency band belonging to the first frequency range is provided in the position closer to the edge of the substrate than the at least one second communication antenna. Even if the vehicle roof is located around the antenna module, radio wave of a relatively low frequency band is diffractively propagated easily. As a result, a communication environment by radio wave in an antenna module is improved.

Details of Embodiment of Present Disclosure

Specific examples of an antenna module and a vehicle roof with an antenna module according to the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
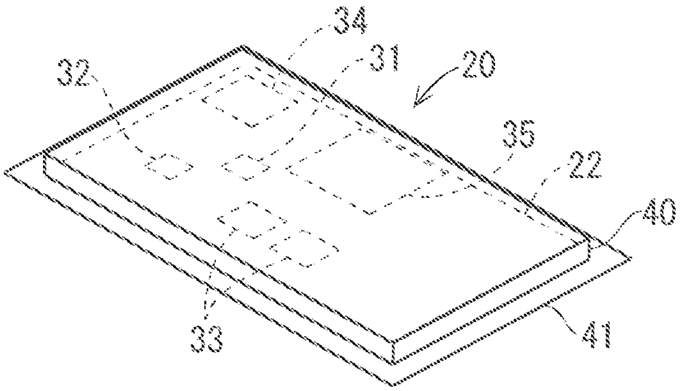
FIG. 2 is a perspective view illustrating the antenna module.
Figure 3:
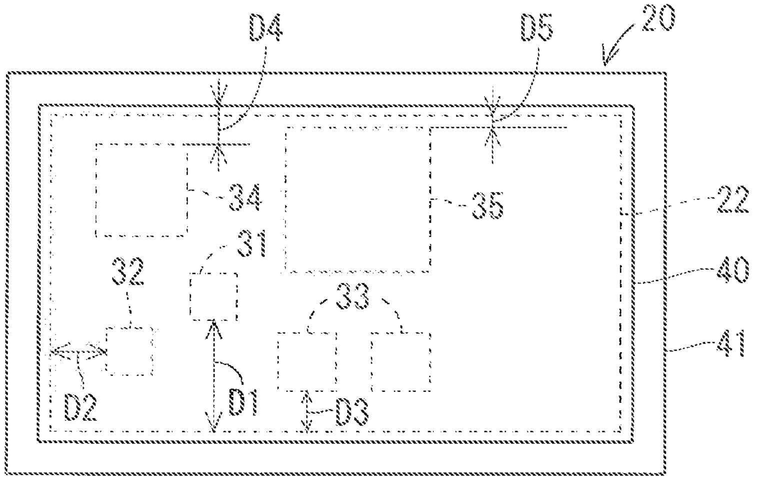
FIG. 3 is a plan view illustrating the antenna module.

An antenna module and a vehicle roof with an antenna module according to an embodiment is described hereinafter. FIG. 1 is a schematic perspective view illustrating a vehicle 10 into which an antenna module 20 is incorporated. FIG. 2 is a perspective view illustrating the antenna module 20. FIG. 3 is a plan view illustrating the antenna module 20.

The vehicle 10 to which the antenna module 20 is assembled includes a body 12. The body 12 is a part forming an outline of the vehicle 10. The body 12 may be a monocoque body or a body mounted on a ladder type frame. The body 12 includes a vehicle roof part 13. The vehicle roof part 13 is a pan provided on an upper side of a vehicle interior. The vehicle roof part 13 may be formed integrally with the other part of the body 12. The vehicle roof part 13 may have a configuration of being separated from the other part of the body 12 and attached to the other part of the body 12.

The vehicle roof part 13 may be formed by metal or resin. The vehicle roof part 13 is formed by a metal plate herein. The vehicle roof part 13 shields radio wave. The vehicle roof part 13 may be made of resin. In this case, a radio wave shielding layer may be provided in the vehicle roof part 13. The radio wave shielding layer may be a part formed of metal such as aluminum or iron. The radio wave shielding layer may be a layer having a selective radio wave shielding property such as a known frequency selective surface (FSS).

A case where the vehicle roof part 13 is formed by metal or a case where the radio wave shielding layer is provided in the vehicle roof part 13 is an example of the vehicle roof to be an obstacle to the radio wave of at least a part of frequency band.

An opening 13*a* is formed in the vehicle roof part 13. Herein, the opening 13*a* is formed closer to a back side in the vehicle roof part 13. The opening 13*a* is located in a center in a vehicle width direction. A front-back direction is a front-back direction with respect to the vehicle 10, a forward traveling direction of the vehicle 10 is a front side, and a backward traveling direction thereof is a back side. A right-left direction is based on a state of being directed to the front side of the vehicle 10. The right-left direction is also a width direction. An up-down direction is an up-down direction with respect to the vehicle 10. The opening may be located closer to the front side of the vehicle 10, or may be located closer to one lateral side.

The antenna module 20 is fitted into the opening 13*a*. A member made up of the opening 13*a* into which the antenna module 20 is fitted in the vehicle roof part 13 can be considered a vehicle roof with an antenna module 70.

The antenna module 20 includes a substrate 22 and a plural types of antennas 31, 32, 33, 34, and 35.

The substrate 22 includes an insulation plate. The substrate 22 may be a metal plate not including the insulation plate. The substrate 22 may be a composite plate of an insulation plate and a metal plate. The plural types of antennas 31, 32, 33, 34, and 35 are provided on a surface on a front side (vehicle exterior side) of the substrate 22. A conductive layer as a ground is formed by a metal foil, for example, on a surface of a back side (vehicle interior side) of the insulation plate.

The plural types of antennas 31, 32, 33, 34, and 35 are communication antennas by a frequency band different from each other. The communication herein includes interactive communication and one-way communication. Each of the antennas 31, 32, 33, 34, and 35 may be a planar antenna or an antenna having a three-dimensional structure.

An antenna in the plural types of antennas 31, 32, 33, 34, and 35 performing communication by a highest frequency band is defined as the communication antenna 31. In this case, the communication antenna 31 is provided in a position with a largest distance D1 from the edge of the substrate 22 in the plural types of antennas 31, 32, 33, 34, and 35.

An antenna in the plural types of antennas 31, 32, 33, 34, and 35 performing communication by a lowest frequency band is defined as the communication antenna 35. The communication antenna 35 is provided in a position with a smallest distance D5 from the edge of the substrate 22 in the plural types of antennas 35, 32, 33, 34, and 35.

A distance from the antennas 31, 32, 33, 34, and 35 to the edge of the substrate 22 indicates a smallest distance from an outer edge part of the antennas 31, 32, 33, 34, and 35 to an outer edge part of the substrate 22.

Assumed as more specific examples of the antennas 31, 32, 33, 34, and 35 are an antenna for performing communication with a wireless base station in a public communication line or a private communication line, an antenna for vehicle-and-vehicle communication or road-and-vehicle communication, or an antenna for receiving a GPS signal. For example, the antenna 31 is a communication antenna by 28 GHz band. The antenna 31 is provided in a position closer to one short side in relation to a center of the substrate 22. A distance from the antenna 31 to the edge of the substrate 22 is D1. The antenna 32 is a communication antenna by 5.8 GHz band. The antenna 32 is provided in a position close to one corner in the substrate 22. A distance from the antenna 32 to the edge of the substrate 22 is D2. The antenna 33 is a communication antenna by 5 GHz band. The antenna 33 is provided in a position in a middle part of the substrate 22 in a long-side direction and close to one long side thereof. The antenna 33 is a diversity antenna, thus a plurality of (two herein) antennas 33 are illustrated. A distance from the antenna 33 to the edge of the substrate 22 is D3. The antenna 34 is a communication antenna by 1.5 GHz band. The antenna 34 is provided in a position close to the other one corner in the substrate 22. A distance from the antenna 34 to the edge of the substrate 22 is D4. The antenna 35 is a communication antenna by 760 MHz band. The antenna 35 is provided in a position in a middle part of the substrate 22 in the long-side direction and close to the other one long side thereof. A distance from the antenna 35 to the edge of the substrate 22 is D5.

Assuming the frequency bands described above, the antenna 31 is a communication antenna for performing communication by a highest frequency band (28 GHz). The distance D1 from the antenna 31 to the edge of the substrate 22 is larger than the other distances D2, D3, D4, and D5. That is to say, the antenna 31 for the highest frequency band is located farther away from the edge of the substrate 22 than the other antennas 32, 33, 34, and 35.

The antenna 35 is a communication antenna for performing communication by a lowest frequency band (760 MHz band). The distance D5 from the antenna 35 to the edge of the substrate 22 is smaller than the other distances D1, D2, D3, and D4. That is to say, the antenna 35 for the lowest frequency band is located closer to the edge of the substrate 22 than the other antennas 31, 32, 33, and 34.

The distances D2, D3, and D4 from the antennas 32, 33, and 34 for the frequency bands between the highest frequency band and the lowest frequency band to the edge of the substrate 22 is smaller than the distance D1 described above and larger than the distance D5 described above. That is to say, the antennas 32, 33, and 34 for the middle frequency bands are located closer to the edge of the substrate 22 than the antenna 31, and located farther away from the edge of the substrate 22 than the antenna 35.

The distance from each of the antennas 32, 33, and 34 for the middle frequency bands to the edge of the substrate 22 is not particularly limited. As an example, the distance from each of the antennas 32, 33, and 34 to the edge of the substrate 22 may be increased as the frequency band of each of the antennas 32, 33, and 34 gets higher. For example, the frequency band of the antenna 32 (5.8 GHz band) is higher than the frequency band of the antenna 33 (5 GHz band). The frequency band of the antenna 33 (5 GHz band) is higher than the frequency band of the antenna 34 (1.5 GHz band). In such a case, the distance D2 from the antenna 32 to the edge of the substrate 22 may be larger than the distance D3 from the antenna 33 to the edge of the substrate 22. The distance D3 from the antenna 33 to the edge of the substrate 22 may be larger than the distance D4 from the antenna 34 to the edge of the substrate 22.

In the present embodiment, the substrate 22 and the antennas 31, 32, 33, 34, and 35 are housed in the case 40. The case 40 is formed of resin, for example. The case 40 is formed into a flat rectangular parallelepiped shape. The substrate 22 is housed in the case 40 in a state where four sides of the peripheral edge part of the substrate 22 face four sides of a peripheral wall of the case 40. A flange part 41 protrudes from a lower side part of the case 40 toward an outer periphery.

The flange part 41 can have contact with the edge of the opening 13*a* from a side of the vehicle interior while the antenna module 20 is fitted into the opening 13*a* of the vehicle roof part 13. Accordingly, the positioning of the antenna module 20 with respect to the vehicle roof part 13 is performed. In this state, an outward surface of the antenna module 20 may be flush with an outward surface of the vehicle roof part 13, or may protrude from the outward surface of the vehicle roof part 13.

Figure 4:
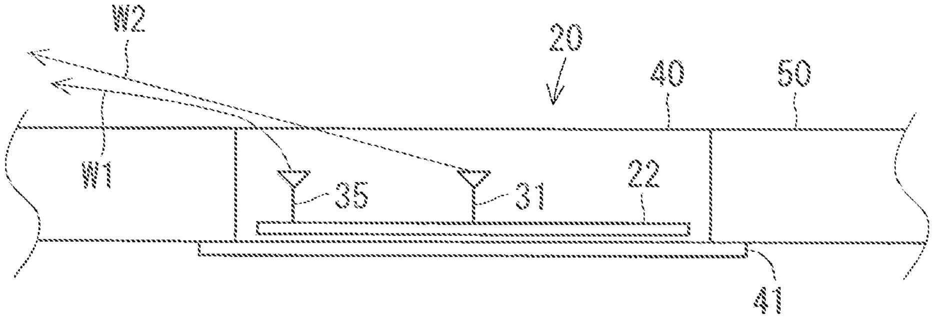
FIG. 4 is an explanation view illustrating a propagation state of radio wave in the antenna module.

FIG. 4 is an explanation view schematically illustrating a propagation state of radio wave in the antenna module 20. In FIG. 4, the antennas 31 and 35 are illustrated as graphic symbols. The distances D1 and D5 are reflected by positions of the antennas 31 and 35 on the substrate 22. An enclosure 50 which is an obstacle to radio wave is disposed around the antenna module 20. As described above, it is assumed that the enclosure 50 is the vehicle roof part 13 in a case where the vehicle roof part 13 is formed by metal or a radio wave shielding layer part in a case where a radio wave shielding layer is provided in the vehicle roof part 13. It can be assumed that in a case where a metal frame is provided around the antenna module 20, the metal frame serves as the enclosure 50 which becomes an obstacle to radio wave.

When the enclosure 50 described above is provided around the antenna module 20, the enclosure 50 can shield radio wave radiated from or to the antennas 31 and 35. Particularly, when the antennas 31 and 35 are located in positions not protruding from the enclosure 50 but deviating to an inner side, the radio wave radiated from the antennas 31 and 35 is radiated to an upper side and an obliquely upper side to some degree, but is hardly radiated directly at an angle close to a horizontal direction.

In the present embodiment, the antenna 35 performing communication by the lowest frequency band in the plural types of antennas 31, 32, 33, 34, and 35 is provided in a position with a smallest distance D5 from the edge of the substrate 22. The enclosure 50 is located in the outer periphery of the substrate 22, thus the antenna 35 is located relatively close to the enclosure 50. Radio wave W1 of a low frequency band is relatively diffracted easily. Thus, even when the antenna 35 is provided near the enclosure 50, the radio wave W1 radiated from the antenna 35 can be diffracted and propagated.

The antenna 31 performing communication by the highest frequency band in the plural types of antennas 31, 32, 33, 34, and 35 is provided in a position with a largest distance D1 from the edge of the substrate 22. The enclosure 50 is located in the outer periphery of the substrate 22, thus the antenna 35 is located relatively far away from the enclosure 50. Radio wave W2 of the high frequency band has high rectilineability. However, the antenna 35 is relatively far away from the enclosure 50, thus the radio wave W2 of the high frequency band is also radiated at an angle relatively close to horizon.

According to the antenna module 20 and the vehicle roof with the antenna module 70 having the above configurations, the communication antenna 31 by the highest frequency band in the plural types of antennas 31, 32, 33, 34, and 35 is provided in the position farthest away from the edge of the substrate 22. Accordingly, even if an obstacle (for example, the enclosure 50) to the radio wave is located around the antenna module 20, the radio wave W2 of the highest frequency band is hardly shielded by the obstacle but can be radiated to a surrounding area at an angle as close to horizon as possible. As a result, communication can be favorably performed via the communication antenna 31 by the highest frequency band. The communication antenna 35 by the highest frequency band in the plural types of antennas 31, 32, 33, 34, and 35 is provided in the position closest to the edge of the substrate 22. Even if an obstacle to radio wave (for example, the enclosure 50) is located around the antenna module 20, the radio wave W1 in the lowest frequency band is diffractively propagated easily. As a result, communication can also be favorably performed via the communication antenna 35 by the lowest frequency band. According to these configurations, a communication environment by radio wave in the antenna module 20 is improved.

Particularly, in the case where the enclosure 50 which is the obstacle to the radio wave is disposed around the substrate 22, a communication environment by radio wave in the antenna module 20 is effectively improved.

When the obstacle is the vehicle roof part 13, the vehicle roof part 13 can shield the radio wave of at least a part of frequency band at the inner side and the outer side of the vehicle. In this case, the antenna module 20 is fitted into the opening 13*a* of the vehicle roof part 13, thus the antennas 31, 32, 33, 34, and 35 can favorably perform communication with an external apparatus.

In this case, the vehicle roof part 13 may be an obstacle to the radio wave. However, as described above, the communication antenna 31 by the highest frequency band is provided to be farthest away from the edge of the substrate 22, and the communication antenna 35 by the lowest frequency band is provided to be closest to the edge of the substrate 22. Thus, a communication environment by radio wave in the antenna module 20 is improved.

Described in the above embodiment is the example that the communication antenna 31 by the highest frequency band is provided in the position farthest away from the edge of the substrate 22, and the communication antenna 35 by the lowest frequency band is provided in the position closest to the edge of the substrate 22.

However, the configuration is not limited to the above example, but a communication environment by radio wave in the antenna module 20 can be improved.

For example, it can also be considered that the antenna module 20 includes: a substrate 22; at least one first communication antenna by a frequency band belonging to a first frequency range; and at least one second communication antenna by a frequency band belonging to a second frequency range higher than the first frequency range, wherein the at least one first communication antenna and the at least one second communication antenna are provided on the substrate 22, and the at least one first communication antenna is provided in a position closer to an edge of the substrate 22 than the at least one second communication antenna.

In this case, it is applicable that the first frequency range is a frequency band equal to or smaller than 2.1 GHz, and the second frequency range is a frequency band equal to or larger than 5.7 GHz. The first frequency band may be equal to or larger than 200 MHz and equal to or smaller than 2.1 GHz. The second frequency range may be equal to or larger than 5.7 GHz and equal to or smaller than 40 GHz.

As exemplified above, the antenna 31 is the communication antenna by 28 GHz band, the antenna 32 is the communication antenna by 5.8 GHz band, the antenna 33 is the communication antenna by 5 GHz band, the antenna 34 is the communication antenna by 1.5 GHz band, and the antenna 35 is the communication antenna by 760 MHz band. In this case, the at least one first communication antenna is the antenna 34 and the antenna 35. The at least one second communication antenna is the antenna 31 and the antenna 32. The antenna 33 is the antenna which does not fall under any of the first communication antenna and the second communication antenna.

The antennas 34 and 35 which are the at least one first communication antenna (the distances from the edge are D4 and D5, respectively) are provided in the positions closer to the edge of the substrate 22 than the antennas 31 and 32 which are the at least one second communication antenna (the distances from the edge are D1 and D2, respectively) (that is to say, D4 and D5 are smaller than D1 and D2).

Even in this case, the at least one second communication antenna 31 and/or 32 by the frequency band belonging to the second frequency range higher than the first frequency range is provided in the position farther away from the edge of the substrate 22 than the at least one first communication antenna 34 and/or 35. Thus, even if an obstacle to radio wave is located around the antenna module 20, radio wave from the at least one second communication antenna 31 and/or 32 is hardly shielded by the obstacle. The at least one first communication antenna 33 and/or 34 by the frequency band belonging to the first frequency range is provided in the position closer to the edge of the substrate than the at least one second communication antenna 31 and/or 32. Even if an obstacle to radio wave is located around the antenna module 20, radio wave of a relatively low frequency band is diffractively propagated easily. As a result, a communication environment by radio wave in the antenna module 20 is improved.

For example, it is considered that an antenna for a wireless lock-unlock system (keyless system, for example) of automobiles is for 315/433 MHz, an antenna for intelligent transport systems (ITS) in Japan is for 755 to 765 MHz, an antenna for mobile communication (for example, long term evolution (LTE)) is for 0.8/1.5/1.7/2 GHz, an antenna for remote start is for 920 MHz, an antenna of global navigation satellite system (GNSS) and GPS is for 1.57542 GHz, an antenna for a satellite radio is for 2.32 to 2.35 GHz, an antenna for Bluetooth (trademark) or Wi-Fi (trademark) is for 2.4/5 GHz, an antenna for mobile communication (for example, 5G Sub6) is for 3.6 to 4.1 GHz/4.5 to 4.6 GHz (in Japan), an antenna of Japanese electronic toll collection system (ETC) is for 5.8 GHz, an antenna of U.S. intelligent transport systems (ITS) is for 5.9 GHz, and an antenna for mobile communication (for example, 50 millimeter wave) is for 28 GHz/26 GHz/39 GHz. In a case where the plurality of antennas of them are provided on the same substrate, the plurality of antennas may be separated by the first frequency band and second frequency band to be disposed on the substrate 22 as described above.

Figure 5:
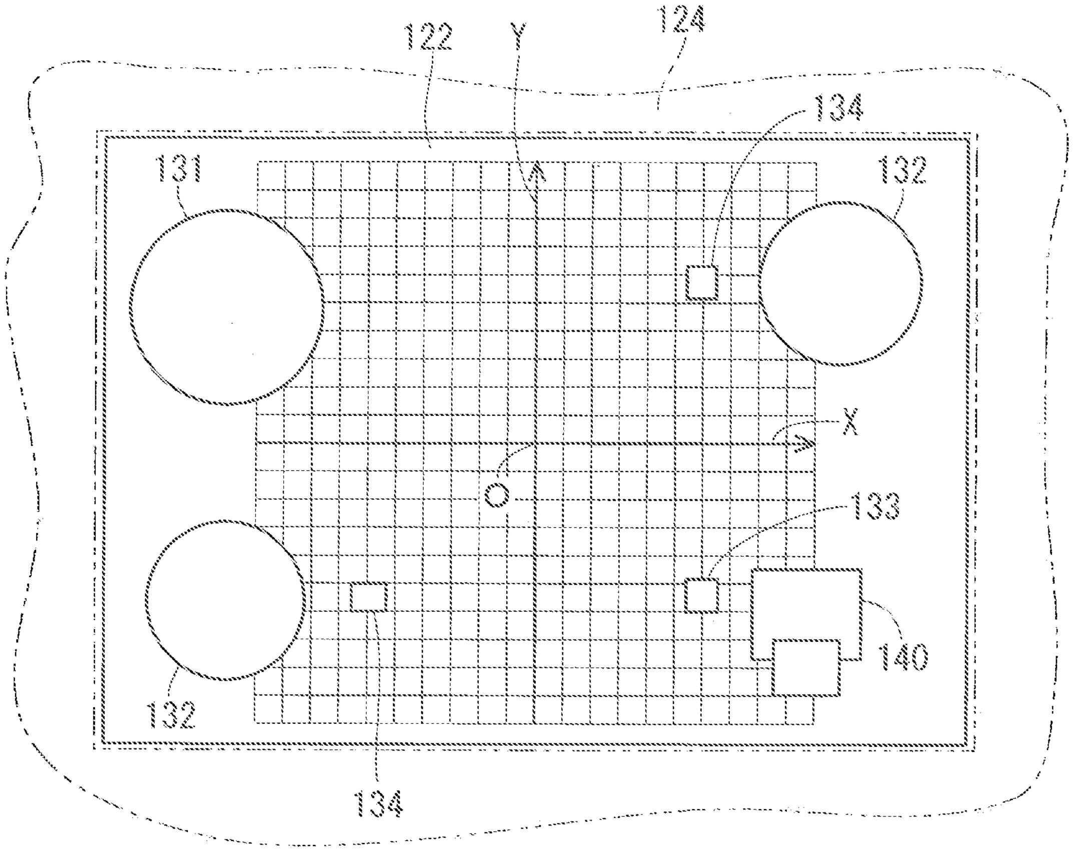
FIG. 5 is an explanation view illustrating an example of an arrangement of an antenna on a substrate.

As illustrated in FIG. 5, the arrangement positions of a plurality of antennas 131, 132, 133, and 134 on a substrate 122 are changed to perform a simulation for obtain Return loss [dB] and a gain Ave. A simulation condition is as follows. A radio wave obstacle 124 corresponding to the roof is disposed around the substrate 122. Disposed on the substrate 122 are the antenna 131 for Japanese ITS (760

MHz) and the two antennas 132 for mobile communication (for TEL, 800 MHz) and the antenna 133 for U.S. ITS (5.9 GHz) and the two antennas 134 for mobile communication (5G Sub 6) (3.6 to 4.1 GHz/4.5 to 4.6 GHz (in Japan)). Also considered is that a GPS amplifier substrate 140 is also disposed on the substrate 122.

Examined under the above condition are an arrangement 1, an arrangement 2, an arrangement 3, an arrangement 4, and an arrangement 5 in which the arrangement positions of the antennas 131, 132, 133, and 134 are changed. The arrangement positions of the antennas 131, 132, 133, and 134 in the arrangements 1 to 5 are illustrated in FIG. 6. In FIG. 6, positions of centers of the antennas 131, 132, 133, and 134 are indicated by an XY coordinate based on a center of the substrate 22 as an origin.

As already exemplified above, when the first frequency range is the frequency band equal to or smaller than 2.1 GHz and the second frequency range is the frequency band equal to or larger than 5.7 GHz, the antennas 131 and 132 are the first antennas, the antenna 133 is the second antenna, and the antenna 134 is not any of the first antenna and the second antenna. Indicated in any of the arrangements 1 to 5 illustrated in FIG. 6 is an example that the antennas 131 and 132 which are the first antennas are located closer to the edge than the antenna 133 which is the second antenna.

A simulation result of the Return loss [dB] and the gain Ave for each of the arrangements 1 to 5 is illustrated in FIG. 7.

The simulation result shows that a favorable result is obtained for the Return loss [dB] and the gain Ave in the case of the arrangement 4. In the case of the arrangement 4, a difference between a distance from the center of the substrate 122 to the first antennas 131 and 132 and a distance from the center of the substrate 122 to the second antenna 133 can be increase. Thus, the result shows that such an arrangement is appropriate for clearly sectioning the arrangement position in that the first antennas 131 and 132 are disposed as close to the center of the substrate 122 as possible and the second antenna is disposed as close to the edge of the substrate 122 as possible. For example, the first antenna may be provided in a position in which a distance from the center of the substrate to a center of the antenna is 20 cm to 90 cm, and preferably in a position in which the distance is approximately 20 cm. The second antenna may be provided in a position in which a distance from the center of the substrate to a center of the antenna is 75 cm to 90 cm, and preferably in a position in which the distance is approximately 70 cm.

Each configuration described in the embodiments and modification examples thereof can be appropriately combined as long as they are not contradictory.

The present disclosure includes an antenna module described hereinafter.

(1) An antenna module includes: a substrate; a plural types of antennas provided on the substrate, wherein each of the plural types of antennas is a communication antenna by a frequency band different from each other, a communication antenna by a highest frequency band in the plural types of antennas is provided in a position farthest away from an edge of the substrate in the plural types of antenna, and a communication antenna by a lowest frequency band in the plural types of antennas is provided in a position closest to an edge of the substrate in the plural types of antennas. The communication antenna by the highest frequency band in the plural types of antennas is provided in a position farthest away from the edge of the substrate. Thus, even if an obstacle to radio wave is located around the antenna module, radio wave of the highest frequency band is hardly shielded by the obstacle. The communication antenna by the lowest frequency band in the plural types of antennas is provided in a position closest to the edge of the substrate. Even if an obstacle to radio wave is located around the antenna module, radio wave in the lowest frequency band is diffractively propagated easily. As a result, a communication environment by radio wave in an antenna module is improved.

(2) An enclosure which is an obstacle to radio wave may be disposed around the substrate. In a case where the enclosure which is the obstacle to the radio wave is disposed around the substrate, a communication environment by radio wave in an antenna module is effectively improved.

The present disclosure includes a vehicle roof with an antenna module described hereinafter.

(3) It is also applicable that a vehicle roof with an antenna module includes: the antenna module; and a vehicle roof which is an obstacle to radio wave of at least a part of frequency band, wherein an opening is formed in the vehicle roof, and the antenna module is fitted into the opening. The vehicle roof shields the radio wave of at least a part of frequency band on an inner side and an outer side of a vehicle interior. The antenna module is fitted into the opening of the vehicle roof, thus the antenna can favorably perform communication with an external apparatus. At this time, the roof may be an obstacle to the communication. The communication antenna by the highest frequency band in the plural types of antennas is provided in a position farthest away from the edge of the substrate. Thus, the radio wave of the highest frequency band hardly suffers interference from the vehicle roof. The communication antenna by the lowest frequency band in the plural types of antennas is provided in a position closest to the edge of the substrate. The radio wave of the lowest frequency band diffracts the vehicle roof and is propagated easily. Thus, a communication environment by radio wave in the antenna module is improved.

EXPLANATION OF REFERENCE SIGNS

10 vehicle
12 body
13 vehicle roof part
13*a* opening
20 antenna module
22 substrate
31, 32, 33, 34, 35 antenna
40 case
41 flange part
50 enclosure
70 vehicle roof with antenna module

The invention claimed is:

1. An antenna module, comprising:

a substrate;

at least one first communication antenna by a frequency band belonging to a first frequency range; and at least one second communication antenna by a frequency band belonging to a second frequency range higher than the first frequency range, wherein three or more types of antennas by frequency bands different from each other including the at least one first communication antenna and the at least one second communication antenna are provided on the substrate, the at least one first communication antenna is provided in a position closer to an edge of the substrate than the at least one second communication antenna, and the second communication antenna by a highest frequency band in the three or more types of antennas in the at least one second communication antenna is provided in a position with a farthest distance from an edge of the substrate.

2. The antenna module according to claim 1, wherein the first frequency range is a frequency band equal to or smaller than 2.1 GHz, and the second frequency range is a frequency band equal to or larger than 5.7 GHz.

3. The antenna module according to claim 1, wherein an enclosure which is an obstacle to radio wave is disposed around the substrate.

4. The antenna module according to claim 1, wherein a first communication antenna by a lowest frequency band in the at least one first communication antenna is provided in a position with a smallest distance from the edge of the substrate in the at least one first communication antenna and the at least one second communication antenna.

5. A vehicle roof with an antenna module, comprising:

the antenna module according to claim 1; and a vehicle roof which is an obstacle to radio wave of at least a part of frequency band, wherein an opening is formed in the vehicle roof, and the antenna module is fitted into the opening.

6. The antenna module according to claim 1, wherein the three or more types of antennas by frequency bands different from each other including the at least one first communication antenna and the at least one second communication antenna are provided on the substrate except for a case where another loop antenna is formed on an inner side of a loop antenna and a patch antenna is formed on an inner side of the another loop antenna.

* * * * *